United States Patent
Hibara

(10) Patent No.: US 11,271,733 B2
(45) Date of Patent: Mar. 8, 2022

(54) COMMUNICATION DEVICE, ELECTRICAL DEVICE, TERMINAL, COMMUNICATION METHOD, AND STORAGE MEDIUM

(71) Applicant: Mitsubishi Electric Corporation, Tokyo (JP)

(72) Inventor: Naoyuki Hibara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 229 days.

(21) Appl. No.: 16/330,134

(22) PCT Filed: Dec. 14, 2016

(86) PCT No.: PCT/JP2016/087142
§ 371 (c)(1),
(2) Date: Mar. 4, 2019

(87) PCT Pub. No.: WO2018/109850
PCT Pub. Date: Jun. 21, 2018

(65) Prior Publication Data
US 2020/0052894 A1    Feb. 13, 2020

(51) Int. Cl.
*H04L 9/08*    (2006.01)
*G06F 21/60*    (2013.01)
(Continued)

(52) U.S. Cl.
CPC .......... *H04L 9/0869* (2013.01); *G06F 21/602* (2013.01); *H04L 9/14* (2013.01); *H04L 63/0428* (2013.01)

(58) Field of Classification Search
CPC ....... G06F 21/602; H04L 9/0869; H04L 9/14; H04L 9/065; H04L 9/3228; H04L 63/0428; H04L 2209/80
(Continued)

(56) References Cited

U.S. PATENT DOCUMENTS

| | | | |
|---|---|---|---|
| 8,281,147 B2 * | 10/2012 | Florencio | H04L 63/0428 713/184 |
| 8,316,237 B1 * | 11/2012 | Felsher | H04L 9/0825 713/171 |

(Continued)

FOREIGN PATENT DOCUMENTS

WO    2015/098622 A1    7/2015

OTHER PUBLICATIONS

International Search Report dated Jan. 31, 2017 issued in corresponding international patent application No. PCT/JP2016/087142 (English translation attached).

*Primary Examiner* — Amare F Tabor
(74) *Attorney, Agent, or Firm* — Posz Law Group, PLC

(57) ABSTRACT

A communication adapter includes: an input unit receiving an operation for requesting transition to a setting mode; a mode setting unit setting a communication mode to the setting mode when the input unit receives the operation for requesting transition to the setting mode; a character string generation unit generating a random character string when receiving a connection start request from a terminal in the setting mode; an image generation unit converting the random character string into image data indicating an image that is difficult for a machine to recognize; an encryption processing unit encrypting transmission data to be transmitted to the terminal using the random character string as an encryption key, and decrypting reception data received from the terminal using the random character string; and a communication processing unit transmitting the image data and the encrypted transmission data to the terminal, and receiving the reception data from the terminal.

9 Claims, 6 Drawing Sheets

(51) Int. Cl.
*H04L 9/14* (2006.01)
*H04L 29/06* (2006.01)

(58) Field of Classification Search
USPC .......................................................... 713/171
See application file for complete search history.

(56) References Cited

U.S. PATENT DOCUMENTS

| | | | | |
|---|---|---|---|---|
| 8,321,682 | B1* | 11/2012 | Read | G06F 21/31 |
| | | | | 713/183 |
| 8,549,315 | B2* | 10/2013 | Read | G06F 21/31 |
| | | | | 713/183 |
| 8,638,689 | B2* | 1/2014 | Goto | H04W 12/041 |
| | | | | 370/254 |
| 9,538,372 | B2* | 1/2017 | Li | H04W 12/04 |
| 9,558,493 | B2* | 1/2017 | Carrott | G06Q 20/3829 |
| 9,646,143 | B2* | 5/2017 | Lavinio | H04L 63/0414 |
| 9,876,766 | B2* | 1/2018 | Ukena | H04L 63/061 |
| 2009/0307748 | A1* | 12/2009 | Blom | G06F 21/31 |
| | | | | 726/2 |
| 2014/0250183 | A1* | 9/2014 | Unagami | H04L 12/2809 |
| | | | | 709/204 |
| 2017/0038087 | A1 | 2/2017 | Nabeshima et al. | |
| 2017/0264435 | A1* | 9/2017 | Song | H04L 9/0822 |
| 2018/0034652 | A1* | 2/2018 | Okazaki | H04L 12/189 |

* cited by examiner

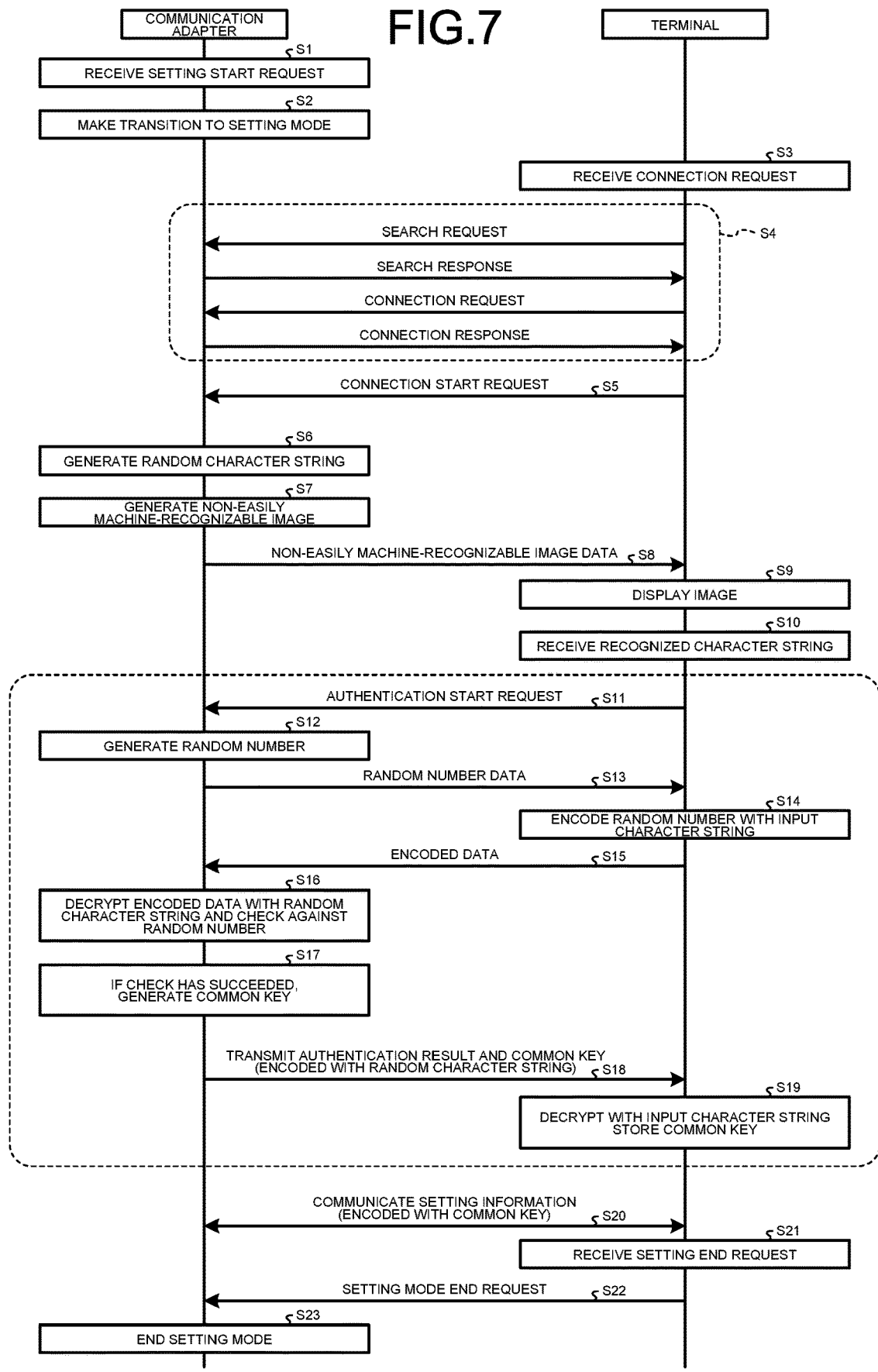

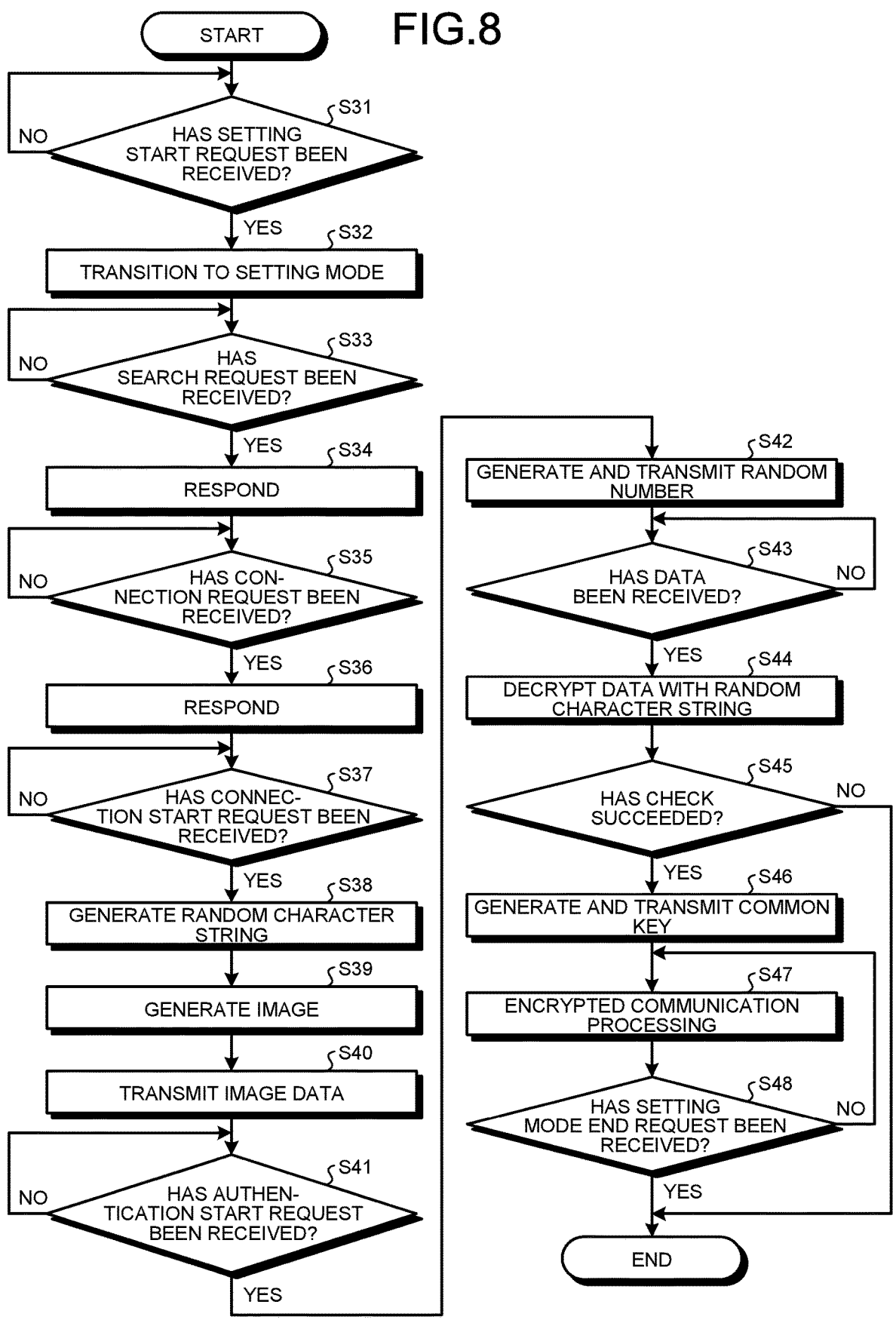

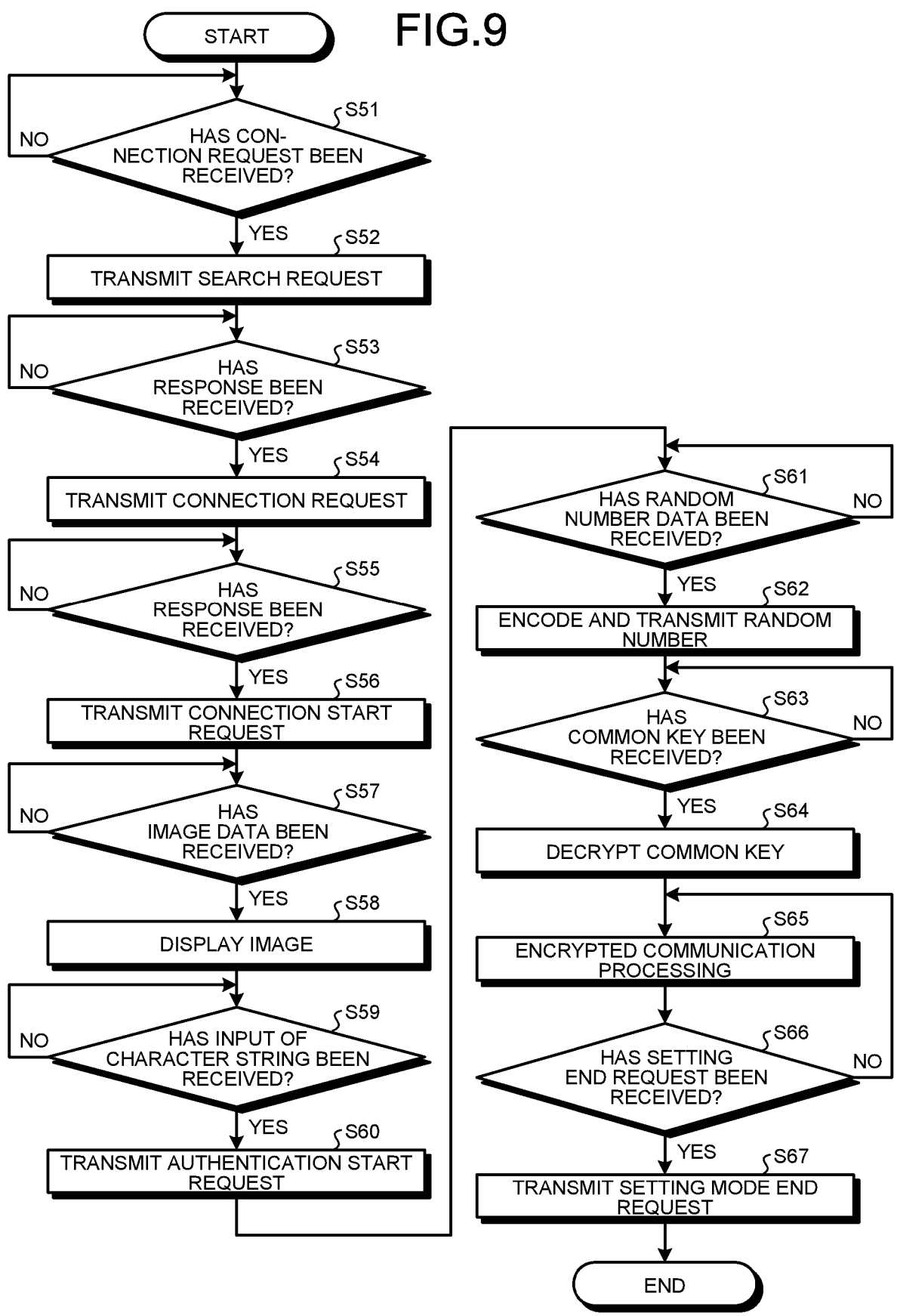

COMMUNICATION DEVICE, ELECTRICAL DEVICE, TERMINAL, COMMUNICATION METHOD, AND STORAGE MEDIUM

CROSS REFERENCE TO RELATED APPLICATION

This application is a U.S. national stage application of International Patent Application No. PCT/JP2016/087142 filed on Dec. 14, 2016, the disclosure of which is incorporated herein by reference.

TECHNICAL FIELD

The present invention relates to a communication device and an electrical device that communicate over an encrypted communication path, a terminal that communicates with the communication device or the electrical device, a communication method, and a program.

BACKGROUND

In recent years, home-use devices having a wireless local area network (LAN) communication function have been developed. When a communication adapter having a wireless LAN communication function is connected to a device that does not have a wireless LAN communication function, communication between the device and a wireless LAN device may be realized.

In a case where a home-use device or communication adapter having a wireless LAN communication function does not have any operation means for receiving the operation of the user, it is impossible to configure the setting for connecting to a master station in wireless LAN communication, such as an access point (AP). In order to solve such a problem, Patent Literature 1 below discloses an air conditioner that configures the setting for wireless LAN communication using a remote controller.

PATENT LITERATURE

Patent Literature 1: International Publication No. WO2015/098622

However, the technique of the above Patent Literature 1 uses a dedicated remote controller and cannot be applied to a system that does not include an ancillary remote controller. Therefore, it is desirable that the setting for wireless LAN communication, that is, the setting for wireless connection, can be realized using a general-purpose terminal such as a smartphone. When configuring the setting using a terminal, it is necessary to encrypt the communication path in order to ensure the security of communication between the terminal and a home-use device or communication adapter that is a communication instrument. Therefore, the user needs to input, to the terminal, information such as a service set identifier (SSID) and a password, attached to the home-use device or communication adapter. This causes the following problem: the user needs to perform a complicated, time-consuming setting work. Not only for the above-mentioned setting for wireless LAN communication but also for setting of a home-use device via another home-use device or a communication adapter from a terminal for other purposes, similar problems have been present in that the user needs to perform a complicated, time-consuming setting work in order to ensure the security of communication between the terminal and the home-use device or communication adapter. On the other hand, if the communication path is not protected using a password for the purpose of saving the user's labor, unauthorized access or interception of communication might occur, which is another problem.

SUMMARY

The present invention has been made in view of the above circumstances, and an object thereof is to provide a communication device that enables the setting of an electrical device using a terminal while ensuring the security of communication and simplifying the user's setting work.

In order to solve the above-mentioned problems and achieve the object, a communication device of the present invention comprises: an input unit to receive an operation for requesting transition to a setting mode; and a mode setting unit to set a communication mode to the setting mode when the input unit receives the operation for requesting transition to the setting mode. The communication device further comprises: a character string generation unit to generate a random character string when receiving a connection start request from a terminal in the setting mode; and an image generation unit to convert the random character string into image data representing an image that is difficult for a machine to recognize. The communication device moreover comprises: an encryption processing unit to encrypt transmission data to be transmitted to the terminal using the random character string as an encryption key, and decrypt reception data received from the terminal using the random character string; and a communication processing unit to transmit the image data and the encrypted transmission data to the terminal, and receive the reception data from the terminal.

The communication device according to the present invention has an advantageous effect of enabling the setting of an electrical device using a terminal while ensuring the security of communication and simplifying the user's setting work.

BRIEF DESCRIPTION OF DRAWINGS

FIG. 7 is a diagram illustrating an example of a sequence for configuring the setting for wireless communication between the communication adapter and a wireless communication device.

FIG. 8 is a flowchart illustrating an exemplary operation of the communication adapter.

FIG. 9 is a flowchart illustrating an exemplary operation of the terminal.

DETAILED DESCRIPTION

Hereinafter, detailed description is given for a communication device, an electrical device, a terminal, a communication method, and a program according to an embodiment of the present invention with reference to the drawings. The present invention is not necessarily limited by the embodiment.

EMBODIMENT

Figure 1:
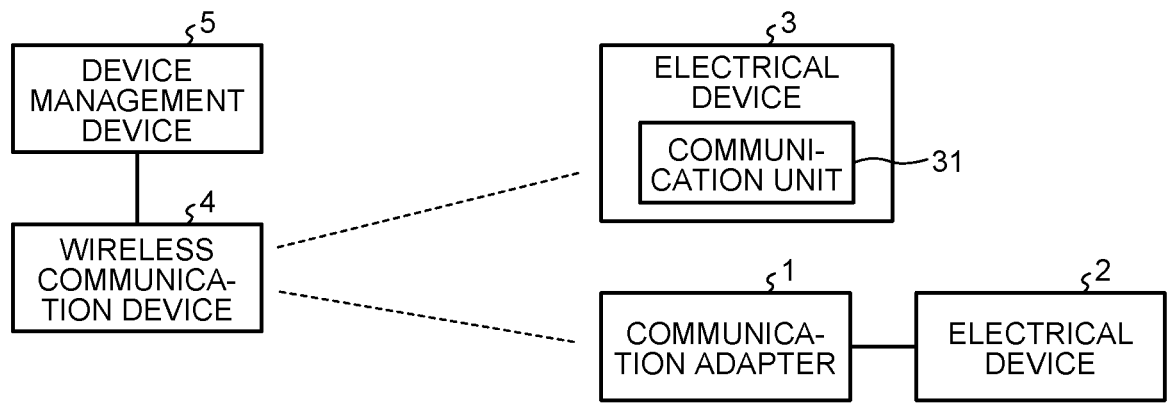
FIG. 1 is a diagram illustrating an exemplary configuration of a communication system according to the present invention.

FIG. 1 is a diagram illustrating an exemplary configuration of a communication system according to the present invention. As illustrated in FIG. 1, the communication system of this embodiment includes a communication adapter 1, electrical devices 2 and 3, a wireless communication device 4, and an instrument management device 5. The electric instruments 2 and 3 are household electrical products such as an air conditioner, a rice cooker, or a refrigerator, for example, but are not limited to household electrical products. The communication adapter 1 that is a communication device is connected to the electrical device 2, and is capable of transmitting data to and receiving data from the electrical device 2. The electrical device 3 includes a communication unit 31 that performs wireless communication. In FIG. 1, components for realizing functions other than communication in the electric instrument 3, e.g., components for realizing air conditioning in a case where the electric instrument 3 is an air conditioner, are not illustrated.

The wireless communication device 4 is a wireless master station device such as an AP in a wireless LAN. FIG. 1 shows a situation in which the electrical device 3 and the communication adapter 1 are each communicating with the wireless communication device 4 after the connection settings for wireless communication with the wireless communication device 4.

The device management device 5 is a communication device that manages the wireless communication device 4. The device management device 5 may have a function of managing the electrical device 3 and the electrical device 2 via the wireless communication device 4 or via the wireless communication device 4 and the communication adapter 1.

Figure 2:
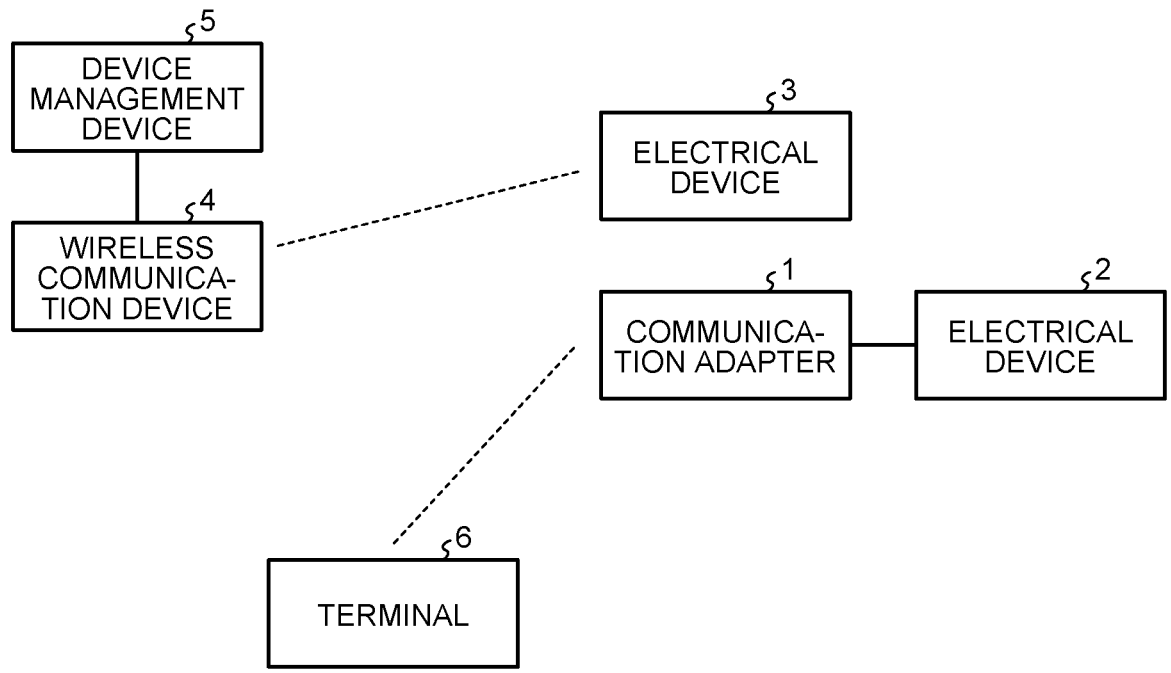
FIG. 2 is a diagram illustrating a situation in which the setting for wireless communication is performed on a communication adapter in a communication system according to an embodiment.

FIG. 2 is a diagram illustrating a situation in which the setting for wireless communication is performed on the communication adapter 1 in the communication system according to the present embodiment. In the present embodiment, before the communication adapter 1 performs wireless communication with the wireless communication device 4, the setting of the communication adapter 1 is configured through the terminal 6 for wireless communication. The terminal 6 is a general-purpose terminal such as a smartphone or a tablet. In the terminal 6, a program for configuring the wireless connection setting of the electrical device 2 is installed.

Figure 3:
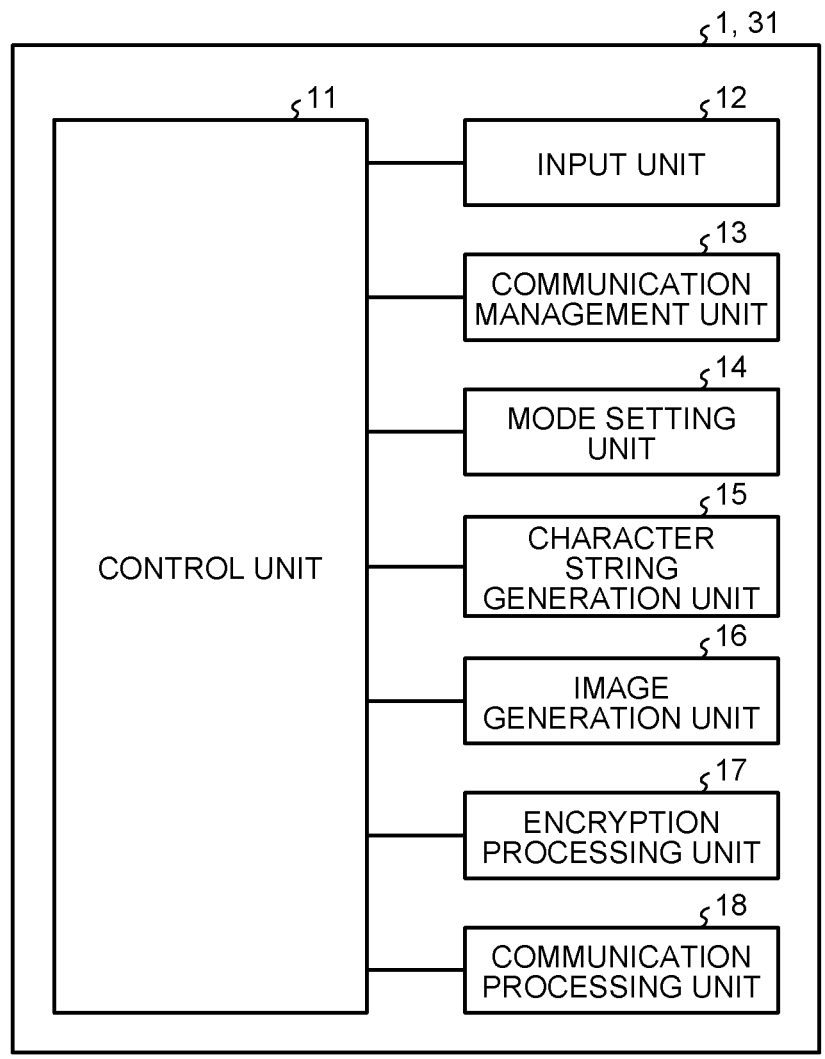
FIG. 3 is a diagram illustrating an exemplary configuration of the communication adapter.

FIG. 3 is a diagram illustrating an exemplary configuration of the communication adapter 1 according to the present embodiment. The configuration of the communication unit 31 of the electrical device 3 illustrated in FIG. 1 is similar to the configuration illustrated in FIG. 3. Hereinafter, the configuration and operation of the communication adapter 1 will be described as an example, but the configuration and operation of the communication unit 31 are similar to the configuration and operation of the communication adapter 1.

As illustrated in FIG. 3, the communication adapter 1 includes a control unit 11, an input unit 12, a communication management unit 13, a mode setting unit 14, a character string generation unit 15, an image generation unit 16, an encryption processing unit 17, and a communication processing unit 18. The control unit 11 controls each unit constituting the communication adapter 1.

The input unit 12 receives an operation for requesting transition to a setting mode. The setting mode will be described later. The mode setting unit 14 sets the communication mode to the setting mode in response to the input unit 12 receiving the operation for requesting transition to the setting mode. The character string generation unit 15 generates a random character string in response to receiving a connection start request from the terminal 6 in the setting mode. The image generation unit 16 converts the random character string into image data indicating an image that is difficult for a machine to recognize. The encryption processing unit 17 encrypts transmission data to be transmitted to the terminal 6 using the random character string as an encryption key, and decrypts reception data received from the terminal 6 using the random character string. The communication processing unit 18 performs wireless transmission/reception processing. Specifically, for example, the communication processing unit 18 transmits the image data and the encrypted transmission data to the terminal 6, and receives the reception data from the terminal 6.

The above-described transmission data includes a common key. The encryption processing unit 17 generates the common key, encrypts the common key using the random character string, decrypts, using the common key, data received from the terminal 6 after the encrypted common key is transmitted to the terminal 6, and encrypts, using the common key, data to be transmitted to the terminal 6 after the encrypted common key is transmitted to the terminal 6. The above-described reception data includes data encrypted in the terminal 6 using the common key.

The mode setting unit 14 ends the setting mode when receiving, from the terminal 6, a setting mode end request that is a request to end the setting mode. Once the setting mode is ended, the communication adapter 1 returns to the normal mode. In the setting mode, the communication management unit 13 operates as a master device in wireless communication, and limits the number of terminals 6 connectable to the communication adapter 1 to one in the setting mode. Even if a request to end the setting mode has not yet been received from the terminal 6, the mode setting unit 14 ends the setting mode when a determined period of time has elapsed since completion of the transition to the setting mode.

Figure 4:
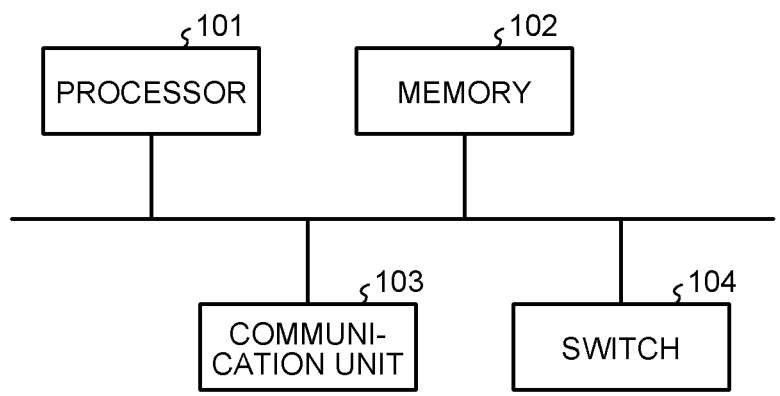
FIG. 4 is a diagram illustrating a hardware configuration for realizing the communication adapter.

FIG. 4 is a diagram illustrating a hardware configuration for realizing the communication adapter 1. As illustrated in FIG. 4, the communication adapter 1 is realized by, for example, a processor 101, a memory 102, a communication unit 103, and a switch 104. The processor 101 that is control circuitry corresponds, for example, to a central processing unit (CPU) or the like, and executes a wireless communication program for realizing the function of the communication adapter 1 of the present embodiment. The memory 102 includes various types of memories such as a random access memory (RAM) and a read only memory (ROM) and a storage device such as a hard disk, and stores programs to be executed by the processor 101 and necessary data obtained during processing. A user of the computer system uses it to input various kinds of information. The communication unit 103 is a transmitter and a receiver, and is composed of an antenna and a communication processing circuit. The switch 104 may be a changeover mechanism referred to as the so-called switch, or may be a type that can be pressed, such as a button.

The units illustrated in FIG. 3 except the input unit 12 are implemented by the processor 101 reading and executing the wireless communication program stored in the memory 102. When the wireless communication program is executed, the wireless communication program read from the memory 102 is expanded in the memory 102. In this state, the processor 101 executes the wireless communication processing of the present embodiment according to the wireless communication program stored in the memory 102. The input unit 12 is realized by the switch 104.

Figure 5:
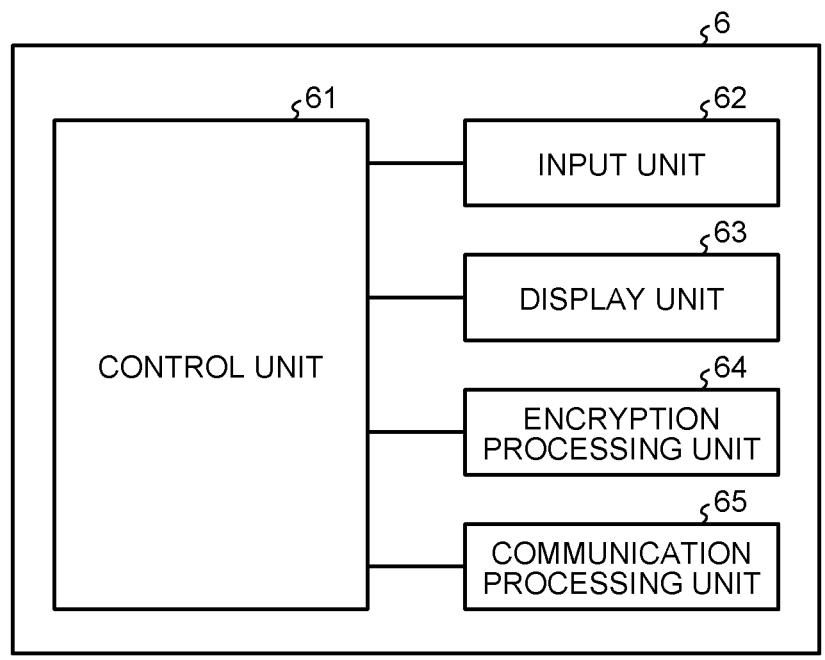
FIG. 5 is a diagram illustrating an exemplary configuration of a terminal.

FIG. 5 is a diagram illustrating an exemplary configuration of the terminal 6. As illustrated in FIG. 5, the terminal 6 includes a control unit 61, an input unit 62, a display unit 63, an encryption processing unit 64, and a communication processing unit 65. The control unit 61 controls each of the units constituting the terminal 6.

The input unit 62 receives input from the user. The communication processing unit 65 performs wireless communication processing. For example, the communication processing unit 65 transmits a search request for searching for a connectable master device in response to the input unit 62 receiving input of a connection request for requesting a wireless connection, transmits a connection request for requesting a connection to a response device that is the master device having responded to the search request, and transmits a connection start request for requesting the initiation of a connection for configuring the setting to the response device when a response to the connection request is acquired. A specific example of the response device is the communication adapter 1 or the electrical device 3. The display unit 63 displays image data received from the response device. The encryption processing unit 64 holds a character string inputted from the user through the display of the image data, decrypts data received from the response device using the character string, and encrypts data to be transmitted to the response device using the character string.

Figure 6:
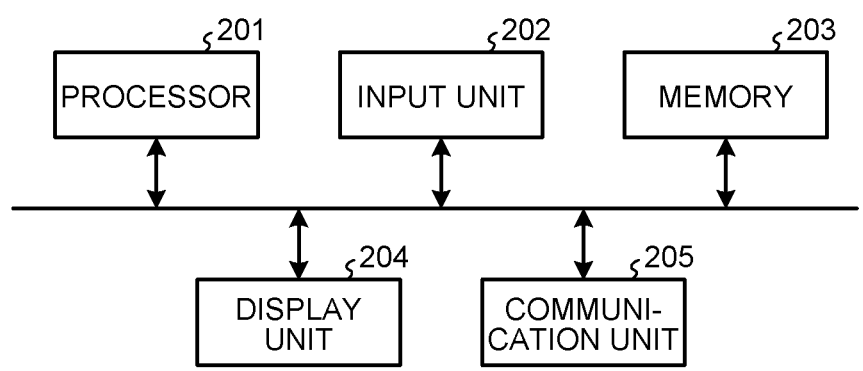
FIG. 6 is a diagram illustrating a hardware configuration for realizing the terminal.

FIG. 6 is a diagram illustrating a hardware configuration for realizing the terminal 6. As illustrated in FIG. 6, the terminal 6 is realized by, for example, a processor 201, an input unit 202, a memory 203, a display unit 204, and a communication unit 205. The processor 201 that is control circuitry corresponds, for example, to a CPU or the like, and executes a wireless setting program for realizing the function of the terminal 6 of the present embodiment. The input unit 202 is constructed, for example, of a keyboard, a mouse, a touch screen, or the like. The memory 203 includes various types of memories such as a RAM and a ROM and a storage device such as a hard disk, and stores programs to be executed by the processor 201 and necessary data obtained during processing. The display unit 204 is, for example, a display. The communication unit 205 is a transmitter and a receiver, and is composed of an antenna and a communication processing circuit.

The units illustrated in FIG. 5 except the input unit 62, the communication processing unit 65, and the display unit 63 are realized by the processor 201 reading and executing the wireless setting program stored in the memory 203. When the wireless setting program is executed, the wireless setting program read from the memory 203 is expanded in the memory 203. In this situation, the processor 201 executes the wireless setting processing of the present embodiment according to the wireless setting program stored in the memory 203. The display unit 63 illustrated in FIG. 5 is realized by the display unit 204, and the input unit 62 illustrated in FIG. 5 is realized by the input unit 202. The communication processing unit 65 illustrated in FIG. 5 is realized by the communication unit 205.

As will be described later, the wireless setting program is a program that causes the terminal 6 that is a computer to execute: a first step of transmitting a search request for searching for a connectable master device in response to reception of input of a connection request for requesting wireless connection; and a second step of transmitting a connection request for requesting connection to a response device that is the master device that has responded to the search request. In addition, the wireless setting program is a program that causes the terminal 6 that is a computer to execute: a third step of transmitting a connection start request for requesting the initiation of connection for configuring the setting of the response device in response to obtaining a response to the connection request; and a fourth step of displaying image data received from the response device. Further, the wireless setting program is a program that causes the terminal 6 that is a computer to execute a fifth step of holding a character string inputted from the user through the display of the image data, decrypting data received from the response device using the character string, and encrypting data to be transmitted to the response device using the character string.

Next, the operation of the present embodiment will be described. FIG. 7 is a diagram illustrating an example of a sequence for configuring the setting for wireless communication between the communication adapter 1 and the wireless communication device 4. FIG. 7 illustrates the operation of each device in which the setting for wireless communication in completed in response to reception of the user's request for the initiation of wireless communication from a state of the communication adapter 1 not being wirelessly connected to the wireless communication device 4. In a case where the user wishes to cause the terminal 6 to communicate with the communication adapter 1 in order to, for example, start wireless communication between the communication adapter 1 and the wireless communication device 4, the user operates the input unit 12 of the communication adapter 1, and operates the terminal 6 to input a connection request.

As illustrated in FIG. 7, the communication adapter 1 receives a setting start request by detecting that the input unit 12 is operated by the user (step S1). The input unit 12 is the switch 104 as described above.

Upon receiving the setting start request, the communication adapter 1 makes the transition to the setting mode with a time limit (step S2). In other words, in response to being notified of the acceptance of the setting start request, the communication adapter 1 operates in the setting mode until it receives a setting mode end request. The communication adapter 1 normally operates as a slave device in wireless communication, but operates as an access point (master device) mode in the setting mode. In the setting mode, the communication adapter 1 neither performs restrictions on connection using a password nor encrypts communication in wireless communication. The communication adapter 1 limits the number of terminals to be connected to one in the setting mode.

The terminal 6 receives input of a connection request by an operation from the user (step S3). Specifically, the wireless setting program is installed in the terminal 6, and, for example, the user operates the input unit 62 to activate the wireless setting program. Once the wireless setting program is activated, the control unit 61 causes the display unit 63 to display a screen for accepting input of a connection request. In this situation, the user operates the input unit 62 to input the above-described connection request. Upon receiving the input of the connection request, the input unit 62 of the terminal 6 notifies the control unit 61 of that reception.

Upon accepting the input of the connection request, the terminal 6 performs connection processing (step S4). Specifically, the communication processing unit 65 transmits a search request as a wireless signal. This search request is a message for searching for the communication adapter 1 operating as a master device, that is, operating in the setting mode. For example, a message similar to a message for searching for a master device in a wireless LAN can be used as the search request. Upon receiving a search response that is a response to the search request from the communication adapter 1, the communication processing unit 65 transmits a connection request to the communication adapter 1. The search response includes information necessary for establishing a wireless connection with the communication adapter 1, such as a network address of the communication adapter 1. The communication processing unit 65 transmits a connection request to the communication adapter 1 based on the search response, and receives a connection response from the communication adapter 1. The aforementioned has been given for the connection processing in step S4 until a connection response is received.

Next, the terminal 6 transmits, to the communication adapter 1, a connection start request which is a request for starting the setting for wireless connection with the wireless communication device 4 (step S5).

Upon receiving the connection start request, the communication adapter 1 generates a random character string (step S6), and generates an image that indicates the generated random character string and is difficult for a machine to recognize (step S7). An image that is difficult for a machine to recognize is an image that is used in the challenge-response method, and used for recognizing the responder as a person, not a machine. The above-described random character string is used when the communication adapter 1 encodes a common key and transmits the encoded result to the terminal 6 as described later.

The image data of the image that is difficult for a machine to recognize (non-easily machine-recognizable image data) is transmitted to the terminal 6 (step S8). The terminal 6 displays the image data of the image that is difficult for a machine to recognize, received from the communication adapter 1 (step S9). In a situation where the user views the image that is difficult for a machine to recognize, displayed on the terminal 6, the user inputs, to the terminal 6, a character string he or she can read from the image. The terminal 6 receives the character string inputted from the user, that is, the user's recognized character string (step S10).

In response to accepting the user's recognized character string, the terminal 6 transmits, to the communication adapter 1, an authentication start request for requesting the initiation of authentication processing for allowing the terminal 6 to communicate with the communication adapter 1 (step S11). The communication adapter 1 generates a random number (step S12). The communication adapter 1 transmits the generated random number, that is, the random number data, to the terminal 6 (step S13).

The terminal 6 encodes the random number received from the communication adapter 1 with the user's recognized character string which is the character string inputted in step S10 (step S14). This encoding makes it difficult to decipher the data even if the data is intercepted, and corresponds to encryption using the user's recognized character string as an encryption key, for example. Next, the terminal 6 transmits data obtained by the encoding, that is, encoded data to the communication adapter 1 (step S15).

The communication adapter 1 decrypts the received encoded data with the random character string generated in step S6, and checks the decryption result against the random number generated in step S12 (step S16). If a successful result of the check is achieved, the communication adapter 1 generates a common key (step S17). Next, the communication adapter 1 encodes the authentication result and the common key with the random character string, and transmits the encoded results to the terminal 6 (step S18). This encoding is similar to the encoding in step S14 and makes it difficult to decipher the data even if the data is intercepted. For example, the encoding corresponds to encryption using the random character string as an encryption key.

The terminal 6 decrypts the encoded data received from the communication adapter 1 with the user's recognized character string which is the character string inputted in step S10, and stores a common key obtained by the decryption (step S19). Processing of steps S11 to S19 is processing for performing authentication of the terminal 6 by the communication adapter 1 and delivery of the common key from the communication adapter 1 to the terminal 6, whereby the delivery of the common key from the communication adapter 1 to the terminal 6 is finished.

Thereafter, data encoded using the common key is exchanged between the terminal 6 and the communication adapter 1. Specifically, the communication for transmitting and receiving setting information such as an SSID and a password, which allows the communication adapter 1 to communicate with the wireless communication device 4 is performed with encoding using the common key (step S20).

Once the communication of the setting information is completed, the terminal 6 displays a screen indicating that the setting information has been received by the communication adapter 1. Upon confirming this screen, the user inputs a setting end request to the terminal 6. Upon accepting the input of the setting end request (step S21), the terminal 6 transmits a setting mode end request to the communication adapter 1 (step S22).

Upon receiving the setting mode end request, the communication adapter 1 ends the setting mode (step S23). Upon ending the setting mode, the communication adapter 1 can operate as a slave device to start communication with the wireless communication device 4 using the setting information received by the communication of step S20.

In the above example, the terminal 6 and the communication adapter 1 communicate with each other in order for the terminal 6 to set, to the communication adapter 1, setting information for enabling the communication adapter 1 to communicate with the wireless communication device 4. However, the sequence illustrated in FIG. 7 is not limited to the setting for enabling the communication adapter 1 to communicate with the wireless communication device 4, and can also be applied to a case when the terminal 6 communicates with the communication adapter 1 for other purposes. It should be noted that the communication adapter 1 may end the setting mode when a setting mode end request is not received even after a lapse of a determined period of time or more after the transition to the setting mode has been made.

In the example of FIG. 7, processing of steps S11 to S17 is performed in order to authenticate whether the random character string that is a pre-shared key is correct or not. Alternatively, without performing steps S11 to S17, the communication adapter 1 may encode the common key with the random character string and transmit the encoded common key in step S18.

Next, the operation of each unit of the communication adapter 1 according to the present embodiment will be described with reference to FIG. 8. FIG. 8 is a flowchart illustrating an exemplary operation of the communication adapter 1. As illustrated in FIG. 8, the control unit 11 of the communication adapter 1 determines whether or not a setting start request has been received by detecting whether the input unit 12 has been operated by the user (step S31).

If a setting start request has not been received (No in step S31), step S31 is repeated. When receiving a setting start request (Yes in step S31), the control unit 11 instructs the mode setting unit 14 to switch to the setting mode, and the mode setting unit 14 makes the transition of a mode to the setting mode (step S32). The mode setting unit 14 notifies the communication management unit 13 via the control unit 11 that the mode has been changed to the setting mode.

Next, the communication management unit 13 determines whether or not a search request has been received via the communication processing unit 18 and the control unit 11 (step S33). If a search request has not been received (No in step S33), step S33 is repeated. When receiving a search request (Yes in step S33), the communication management unit 13 transmits a search response which is a response to the search request, to the terminal 6 via the communication processing unit 18 and the control unit 11 (step S34). Note that the communication management unit 13 counts the number of terminals 6 from which search requests have been received after being notified of the transition to the setting mode. If search requests have been received from two or more terminals 6, the communication management unit 13 does not transmit a search response to the second and subsequent terminals 6.

Next, the communication management unit 13 determines whether or not a connection request has been received via the communication processing unit 18 and the control unit 11 (step S35). If a connection request has not been received (No in step S35), step S35 is repeated. When receiving a connection request (Yes in step S35), the communication management unit 13 transmits a connection response which is a response to the connection request, to the terminal 6 via the communication processing unit 18 and the control unit 11 (step S36).

Next, the communication management unit 13 determines whether or not a connection start request has been received via the communication processing unit 18 and the control unit 11 (step S37). If a connection start request has not been received (No in step S37), step S37 is repeated. When receiving a connection start request (Yes in step S37), the communication management unit 13 instructs the character string generation unit 15 to generate a random character string via the control unit 11, and the character string generation unit 15 generates a random character string (step S38). The character string generation unit 15 notifies the encryption processing unit 17 of the random character string via the control unit 11. Next, the image generation unit 16 generates an image that indicates the random character string generated by the character string generation unit 15 and is difficult for a machine to recognize (step S39). That is, the image generation unit 16 converts the random character string into an image that is difficult for a machine to recognize.

Next, the control unit 11 transmits the image data which is data of an image generated by the image generation unit 16, to the terminal 6 via the communication processing unit 18 (step S40). Next, the communication management unit 13 determines whether or not an authentication start request has been received via the communication processing unit 18 and the control unit 11 (step S41). If an authentication start request has not been received (No in step S41), the communication management unit 13 repeats step S41. When receiving an authentication start request (Yes in step S41), the communication management unit 13 generates a random number and transmits random number data that represents the generated random number, to the terminal 6 via the communication processing unit 18 and the control unit 11 (step S42).

Next, the control unit 11 determines whether or not data has been received via the communication processing unit 18 (step S43). If no data has been received (No in step S43), step S43 is repeated. When receiving data (Yes in step S43), the control unit 11 instructs the encryption processing unit 17 to decrypt the data, and the encryption processing unit 17 decrypts the received data using the random character string (step S44). The encryption processing unit 17 notifies the communication management unit 13 of the decryption result via the control unit 11, and the communication management unit 13 checks the decryption result against the random character string to determine whether or not the check has resulted in success (step S45). If the check has not resulted in success (No in step S45), the communication management unit 13 ends the processing.

If the check has resulted in success (Yes in step S45), the communication management unit 13 instructs the encryption processing unit 17 to generate a common key. The encryption processing unit 17 then generates a common key, encodes the common key with the random character string, and transmits the encoded result to the terminal 6 (step S46). Thereafter, encrypted communication processing is performed using the common key (step S47). The communication management unit 13 determines whether or not a setting mode end request has been received via the communication processing unit 18 and the control unit 11 (step S48). If a setting mode end request has not been received (No in step S48), the processing returns to step S47. When receiving a setting mode end request (Yes in step S48), the communication management unit 13 instructs the mode setting unit 14 to end the setting mode via the control unit 11, and ends the processing.

Next, the operation of each unit of the terminal 6 according to the present embodiment will be described with reference to FIG. 9. FIG. 9 is a flowchart illustrating an exemplary operation of the terminal 6. As illustrated in FIG. 9, the control unit 61 of the terminal 6 determines whether or not a connection request has been received by the operation from the input unit 62 (step S51). If a connection request has not been received (No in step S51), step S51 is repeated. When accepting a connection request (Yes in step S51), the control unit 61 instructs the communication processing unit 65 to transmit a search request, and the communication processing unit 65 transmits a search request (step S52). As described above, this search request is a message for searching for the communication adapter 1 that is operating as a master device, namely, operating in the setting mode.

The communication processing unit 65 determines whether or not a response to the search request has been received (step S53). If a response has not been received (No in step S53), step S53 is repeated. When receiving a response (Yes in step S53), the communication processing unit 65 transmits a connection request (step S54).

The communication processing unit 65 determines whether or not a response to the connection request has been received (step S55). If a response has not been received (No in step S55), step S55 is repeated. When receiving a response (Yes in step S55), the communication processing unit 65 transmits a connection start request to the transmission source of the response, that is, the communication adapter 1 (step S56).

Next, the control unit 61 determines whether or not image data has been received via the communication processing unit 65 (step S57). If no image data has been received (No in step S57), step S57 is repeated. When receiving image data (Yes in step S57), the control unit 61 displays the received image data on the display unit 63 (step S58).

Next, the control unit 61 determines whether or not input of a character string has been received via the input unit 62 (step S59). If input of a character string has not been received (No in step S59), step S59 is repeated. When accepting input of a character string (Yes in step S59), the control unit 61 instructs the communication processing unit 65 to transmit an authentication start request, and the communication processing unit 65 transmits an authentication start request to the communication adapter 1 (step S60). The control unit 61 also notifies the encryption processing unit 64 of the input character string.

Next, the control unit 61 determines whether or not random number data has been received from the communication adapter 1 via the communication processing unit 65 (step S61). If no random number data has been received (No in step S61), step S61 is repeated. When receiving random number data from the communication adapter 1 (Yes in step S61), the control unit 61 instructs the encryption processing unit 64 to encode the received random number data, and the encryption processing unit 64 encodes the received random number data with the character string accepted as an input in step S59, and transmits the encoded random number data to the communication adapter 1 via the control unit 61 and the communication processing unit 65 (step S62).

Next, the control unit 61 determines whether or not a common key has been received via the communication processing unit 65 (step S63). If a common key has not been received (No in step S63), step S63 is repeated. When receiving a common key (Yes in step S63), the control unit 61 instructs the encryption processing unit 64 to decrypt the common key, and the encryption processing unit 64 decrypts the common key with the character string accepted as an input in step S59 (step S64). The encryption processing unit 64 holds the common key obtained by the decryption.

Next, the control unit 61 and the encryption processing unit 64 perform encrypted communication processing with the communication adapter 1 using the common key (step S65). The control unit 61 determines whether or not a setting end request has been received via the input unit 62 (step S66). If a setting end request has not been received (No in step S66), the control unit 61 returns to step S65. When accepting a setting end request (Yes in step S66), the control unit 61 instructs the communication processing unit 65 to transmit a setting mode end request, and the communication processing unit 65 transmits a setting mode end request to the communication adapter 1 (step S67), and ends the processing.

As described above, in the present embodiment, the communication adapter 1 makes the transition to the setting mode using a physical means, and the number of permitted connections is limited to one in the setting mode, so that unauthorized access can be prevented in a simple fashion. Before transmitting a common key to be used in encoding communication of information such as setting information, the communication adapter 1 generates a random character string as a pre-shared key, converts the random character string into an image that is difficult for a machine to recognize, and transmits the image to the terminal 6. The user recognizes the image and inputs his or her recognition result to the terminal 6, whereby the data can be prevented from being deciphered by a machine on the occasion of interception of the data. Then, the common key is encoded and transmitted using the pre-shared key. Therefore, the communication path is encrypted securely without exposing the common key to the communication path. As described above, the present embodiment enables the wireless connection setting of the communication adapter 1 using the terminal 6 while ensuring the security of communication and simplifying the user's setting work.

The configuration described in the above-mentioned embodiment indicates an example of the contents of the present invention. The configuration can be combined with other publicly known techniques, and can be partially omitted and/or modified without departing from the scope of the present invention.

The invention claimed is:

1. A communication device comprising:
   an input circuit to receive an operation for requesting transition to a setting mode;
   a mode setting circuit to set a communication mode to the setting mode when the input circuit receives the operation for requesting transition to the setting mode;
   a character string generation generator to generate a random character string when receiving a connection start request from a terminal in the setting mode;
   an image generator to convert the random character string into image data representing an image that is difficult for a machine to recognize;
   an encryption processor to encrypt transmission data to be transmitted to the terminal using the random character string as an encryption key, and decrypt reception data received from the terminal using the random character string; and
   a communication processor to transmit the image data and the encrypted transmission data to the terminal, and receive the reception data from the terminal.

2. The communication device according to claim 1, wherein
   the transmission data include a common key,
   the encryption processor generates the common key, encrypts the common key using the random character string, decrypts, using the common key, data received from the terminal after the encrypted common key is transmitted to the terminal, and encrypts, using the common key, data to be transmitted to the terminal after the encrypted common key is transmitted to the terminal, and
   the reception data includes data encrypted in the terminal using the common key.

3. The communication device according to claim 1, wherein
   the mode setting circuit ends the setting mode when receiving a request to end the setting mode from the terminal, and
   in the setting mode, the communication device operates as a master device in wireless communication, and limits the number of terminals connectable to the communication device to one in the setting mode.

4. The communication device according to claim 3, wherein
   when a request to end the setting mode has not been received from the terminal but a determined period of time has elapsed since the transition to the setting mode is made, the mode setting circuit ends the setting mode.

5. The communication device according to claim 2, wherein the mode setting circuit ends the setting mode when receiving a request to end the setting mode from the terminal, and in the setting mode, the communication device operates as a master device in wireless communication, and limits the number of terminals connectable to the communication device to one in the setting mode.

6. The communication device according to claim 5, wherein when a request to end the setting mode has not been received from the terminal but a determined period of time has elapsed since the transition to the setting mode is made, the mode setting circuit ends the setting mode.

7. The communication device according to claim 1, wherein the input unit comprises one of a switch and a button.

8. The communication device according to claim 1, wherein the operation for requesting transition to the setting mode received at the input unit is separate from the connection start request received from the terminal.

9. The communication device according to claim 1, wherein the connection start request is received from the terminal after the input unit receives the operation for requesting transition to the setting mode.

* * * * *